(12) United States Patent
Hohberg et al.

(10) Patent No.: US 6,815,069 B2
(45) Date of Patent: Nov. 9, 2004

(54) TEXTILE STRUCTURES COMPRISING ORGANOPOLYSILOXANE POLYUREA-POLYURETHANE BLOCK COPOLYMER

(75) Inventors: Thomas Hohberg, Bielefeld (DE); Oliver Schaefer, Munich (DE); Johann Mueller, Konzell (DE); Philippe Moens, Gijzenzele (BE); Thomas Lehotkay, Muehldorf (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/366,083

(22) Filed: Feb. 13, 2003

(65) Prior Publication Data

US 2003/0176613 A1 Sep. 18, 2003

(30) Foreign Application Priority Data

Feb. 14, 2002 (DE) .......................................... 102 06 123

(51) Int. Cl.$^7$ .............................................. B32B 27/40
(52) U.S. Cl. .................... 428/423.1; 428/447; 252/8.61; 252/8.62; 8/115.51; 8/115.6; 528/38; 528/44; 528/28; 528/29
(58) Field of Search .............................. 8/115.51, 115.6; 252/8.61, 8.62, 8.63; 428/447, 423.1; 528/38, 44, 28, 29

(56) References Cited

U.S. PATENT DOCUMENTS

| | | | |
|---|---|---|---|
| 3,705,823 A | | 12/1972 | Hosokawa et al. |
| 4,098,742 A | | 7/1978 | Mueller |
| 4,464,431 A | * | 8/1984 | Hisaki et al. ............... 442/101 |
| 4,902,767 A | * | 2/1990 | Roitman et al. ............... 528/28 |
| 5,290,615 A | * | 3/1994 | Tushaus et al. ............ 428/41.4 |
| 5,486,634 A | * | 1/1996 | Hahn et al. .................. 556/425 |
| 6,355,759 B1 | * | 3/2002 | Sherman et al. ............. 528/28 |
| 6,524,564 B1 | * | 2/2003 | Kim et al. ................ 424/70.12 |
| 6,627,724 B2 | * | 9/2003 | Meijs et al. .................. 528/26 |
| 6,642,015 B2 | * | 11/2003 | Vachon et al. ................ 435/14 |

FOREIGN PATENT DOCUMENTS

| | | | |
|---|---|---|---|
| DE | 100 51 886 | 1/2002 | |
| DE | 10113980 A1 | * 10/2002 | .......... C08G/18/61 |
| EP | 0 250 248 | 12/1987 | |
| EP | 0 636 361 | 2/1995 | |
| EP | 1 132 378 A2 | 9/2001 | |
| WO | WO 85/05322 | 12/1985 | |
| WO | WO 85/05373 | 12/1985 | |
| WO | WO 00/64971 | 11/2000 | |

OTHER PUBLICATIONS

Derwent Abstract corresponding to DE 100 51 886 [AN 2002–056608].
Derwent Abstract corresponding to EP 636 361 [AN 1995–062089].

* cited by examiner

Primary Examiner—Margaret G. Moore
Assistant Examiner—Marc S. Zimmer
(74) Attorney, Agent, or Firm—Brooks Kushman P.C.

(57) ABSTRACT

Textile structures comprise fibers and an organopolysiloxane-polyurea-polyurethane block copolymer (A) of the general formula (1)

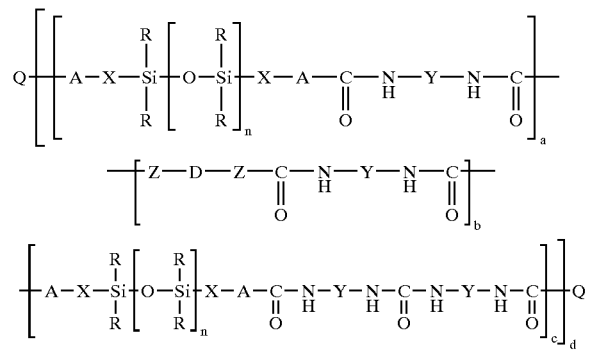

as a coating material or finishing material for fibers where R is a hydrocarbyl group, X is an alkylene group, A and Z are oxygen or primary or secondary amino groups, Y is a divalent hydrocarbyl group, D is an alkylene group, and Q is an end group, $1 \leq n \leq 4000$, $a \geq 1$, $0 \leq b \leq 40$, $0 \leq c \leq 30$, and $d > 0$. The textile structures exhibit excellent hand, waterproofness, and water vapor permeability, and are stable to lanudering.

16 Claims, No Drawings

TEXTILE STRUCTURES COMPRISING ORGANOPOLYSILOXANE POLYUREA-POLYURETHANE BLOCK COPOLYMER

BACKGROUND OF THE INVENTION

1. Field of the Invention

The present invention relates to textile structures comprising an organopolysiloxane-polyurea-(polyurethane) block copolymer and to the use of the block copolymer as a coating material or finishing material for fibers and textile fabrics.

2. Background Art

Polyurethanes are used inter alia as coatings for textile structures. Points of interest here include the protective effect and the water-repelling effect of the polyurethane coating. Polyurethanes are notable in this context for mechanical strength, elasticity, very good adhesion and abrasion resistance. However, polyurethanes also have distinct disadvantages, for example, absence of water vapor permeability, poor low-temperature performance, inadequate hydrolysis stability, high melt viscosities, and in some cases, nonexistent UV stability. Silicone elastomers, by contrast, possess excellent thermal, UV and weather stability, outstanding water vapor permeability and low melt viscosities, all without becoming brittle. They further possess water-repelling and nonstick surface properties. Moreover, coatings composed of crosslinked silicone elastomers have a distinctly more pleasant hand than, for example, polyurethane coatings. Unfortunately, the mechanical properties and the abrasion resistance of silicone elastomer coatings on textiles are inadequate for some applications such as highly stressed sportswear.

WO 00/64971 claims siloxane-containing polyurethane-urea polymers for use as textile fibers and in other applications. The polymers described therein have the common feature of very high moduli of elasticity (25–100 MPa) and breaking strengths (16–32 MPa) and therefore are classified as (impact-modified) thermoplastics. They are therefore proposed for use as a textile or shoe sole, as artificial leather, in membranes, etc.

In principle, the different property profiles of polyurethanes and silicones are very different and theoretically complement each other in an ideal manner. However, it is a matter of common experience that many desired property profiles are not achievable by means of mixtures of silicones and polyurethanes. In part as a result of the physicochemical incompatibility (miscibility, adhesion, reactivity, . . . ) of the components, attempts to combine the positive effects of the individual components by mixing the components together has lead to novel undesirable effects, while the original adverse properties of the individual components have generally persisted.

However, the preparation of urethane and silicone copolymers leads to siloxane-urethane block copolymers having good mechanical properties that are mechanically improved compared with the silicone homopolymers but continue to possess the positive properties of silicones. The combination of the advantages of the two systems thus leads to compounds having low glass transition temperatures, low surface energies, improved thermal and photochemical stabilities and a reduced tendency to hydrolyze. Such materials are described for example in EP 250248 A1 for use as pressure senstive adhesives, and EP 636361 A1 for use in cosmetics.

SUMMARY OF THE INVENTION

It has now been surprisingly discovered that textile properties are markedly improved by treating textile fibers or woven or non-woven fabrics with organopolysiloxane-polyurea-(polyurethane) block copolymers. Fibers and textiles treated with the block copolymers exhibit excellent hand, waterproofness, and water vapor permeability.

DETAILED DESCRIPTION OF THE PREFERRED EMBODIMENT(S)

The present invention provides textile structures comprising fibers and an organopolysiloxane-polyurea-(polyurethane) block copolymer (A) of the general formula (1)

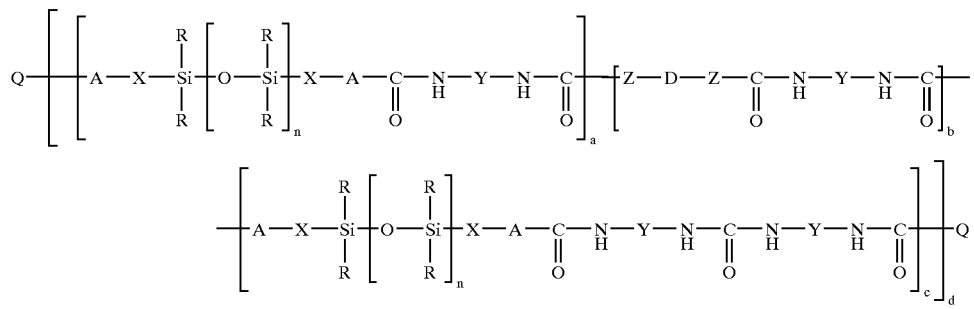

as a coating material or finishing material for fibers where

| | |
|---|---|
| R | is monovalent hydrocarbyl of 1 to 20 carbon atoms optionally substituted by fluorine or chlorine, |
| X | is alkylene of 1 to 20 carbon atoms in which mutually nonadjacent methylene units may be replaced by —O— moieties, |
| A | is an oxygen atom or an amino group —NR'—, |
| Z | is an oxygen atom or an amino group —NR'—, |
| R' | is hydrogen or alkyl of 1 to 10 carbon atoms, |
| Y | is divalent hydrocarbyl of 1 to 20 carbon atoms optionally substituted by fluorine or chlorine, |
| D | is alkylene of 1 to 1,500 carbon atoms in which mutually nonadjacent methylene units may be replaced by —O—, —COO—, —OCO— or —OCOO— moieties and which may be substituted by fluorine, chlorine, $C_1$–$C_6$-alkyl or optionally substituted $C_1$–$C_6$-alkyl ester, the optional substituents being selected from the group consisting of amino groups optionally reacted with an acid, and carboxylic acid or sulfonic acid groups optionally reacted with a base, |
| Q | is a reactive or nonreactive end group which is covalently attached to the polymer, |
| n | is from 1 to 4,000, |
| a | is at least 1, |
| b | is from 0 to 40, |
| c | is from 0 to 30, and |
| d | is greater than 0. |

The expression "organopolysiloxane-polyurea-(polyurethane)" indicates that the presence of urethane segments is optional. Block copolymer (A) is a thermoplastic elastomer having breaking strength of preferably not more than 15 MPa and more preferably not more than 10 MPa. Block copolymer (A) has a pleasant hand, similar to that of silicones. Block copolymer (A) is used in the textile structures not as a structural material (eg as a textile or yarn composed of this material), but as a coating material or finish for the fibers, textile materials and fabrics. The fiber material absorbs the mechanical stresses and the coating or finish confers additional desired properties on the textile.

It was found that textile structures comprising block copolymer (A) have properties which cannot be achieved using existing processes, for example by applying individual components or blends of various individual components to fibers.

Application of block copolymer (A), for example from the melt, from solution, or from dispersion, provides individual and especially novel combinations of the properties and effects recited below, which are durable to laundering: improved processibility (no fraying), optimization of visual impression of surface (e.g. luster), improved surface hand, high waterproofness (>100 mbar), good water repellency, weldability, increased tensile and tear strength of the textile structure, achievement of breathability coupled with waterproofness and a selectively hydrophilic or hydrophobic surface, laundering durability, soil repellency, printability, coatability, inscribability, especially with standard inks, light stability, improved hand properties, enhanced softness, increased elasticity, low temperature flexibility, improved drape, improved crease recovery, easier ironing, prolongation of smoothing effects from ironing, enhanced surface smoothness and hence reduced frictional forces during processing, for example improved sewability, protection of fibers against light, chemicals, heat and weather effects, an increase in the light protection factor of the textile structure, improved seam slip resistance, improved pilling properties, reduced tendency to shrink, reduced tendency to felt, improved hydrophilicity, color deepening on dyed fibers, enabling the production of conductive surfaces, antistatic effects, and thermoformable textile structures. Combination with fluorocarbon hydrophobic finishing chemistry makes it possible to improve the above effects, especially the softness. Similar effects can be achieved at reduced fluorocarbon use levels.

Preferably, R is monovalent hydrocarbyl of 1 to 6 carbon atoms, most preferably unsubstituted. Particularly preferred R radicals are methyl, ethyl, vinyl and phenyl radicals.

Preferably, X is alkylene of 1 to 10 carbon atoms, preferably not interrupted by oxygen atoms.

Preferably, A is an NH group or an oxygen atom, while Z is preferably an oxygen atom or an NH group.

Y is preferably hydrocarbyl of 3 to 13 carbon atoms which is most preferably unsubstituted. Y is advantageously aralkylene or linear or cyclic alkylene.

D is preferably alkylene of at least 2 carbon atoms, more preferably, at least 4 carbon atoms and yet more than 12 carbon atoms. Polyoxyalkylene radicals are also preferred for D, especially polyoxyethylene radicals or polyoxypropylene radicals of at least 20 and preferably at least 100, and not more than 800 carbon atoms, most preferably not more than 200 carbon atoms. Preferably, D is unsubstituted.

Q is preferably an alkoxysilyl group, especially a $C_1$–$C_4$-alkoxysilyl group, for example methoxy- or ethoxysilyl, aminoalkyl, hydroxyl or NCO, which are each attached to the polymer via covalent bonds.

n is preferably not less than 3, especially not less than 25 and preferably not more than 800, especially not more than 400, more preferably not more than 250.

Preferably, a is not more than 50.

When b is not 0, it is preferably not more than 50 and especially not more than 25.

c is preferably not more than 10 and especially not more than 5.

The block copolymer (A) of the general formula (1) exhibits high molecular weights and good mechanical properties coupled with good processing properties. Especially the employment of chain extenders such as dihydroxy compounds or water in addition to the urea groups provides further distinct improvement in mechanical properties.

The organopolysiloxane-polyurea-polyurethane block copolymer (A) of the general formula (1) may be prepared by reacting a) aminoalkylpolydiorganosiloxane(s) of the general formula (4)

$$H_2N\text{—}X\text{—}[SiR_2O]_nSiR_2\text{—}X\text{—}NH_2$$

with b) diisocyanates of the general formula (5)

$$OCN\text{—}Y\text{—}NCO$$

and optionally c) bishydroxyalkyl-terminated siloxanes of the general formula (6)

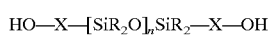

$$HO\text{—}X\text{—}[SiR_2O]_nSiR_2\text{—}X\text{—}OH$$

and compounds selected from d) chain extenders,
e) polyetherpolyols, polyesterpolyols, polyetherpolyesterpolyols of the general formula (7)

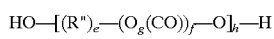

$$HO\text{—}[(R'')_e\text{—}(O_g(CO))_f\text{—}O]_h\text{—}H$$

where

R" is divalent aliphatic or aromatic hydrocarbyl of 1 to 20 carbon atoms which is branched or unbranched ("optionally branched") and may be substituted by fluorine or chlorine, e is 1–10, f and g are independently 0 or 1, and h is from 1 to 500, f) monofunctional chain-terminating reagents,
g) monofunctional polyethers, polyesters,
h) monofunctional or difunctional ionic molecules either in their neutral form or in their salt form, for example amino groups optionally reacted with an acid or carboxylic acid or sulfonic acid groups optionally reacted with a base.

When b is not less than 1, a second step may utilize up to 95 percent by weight, based on all components used, of chain extenders selected from diamines, isocyanate-blocked hydroxy compounds, dihydroxy compounds or mixtures thereof.

The chain extenders preferably have the general formula (8)

$$HZ\text{-}D\text{-}ZH$$

where D and Z are each as defined above. When Z is O, the chain extender of the general formula (8) may also be reacted with diisocyanate of the general formula (5) prior to the reaction in the second step. If desired, water may also be used as chain extender.

Preferably the block copolymer of the general formula (1) contains not less than 25 mol %, more preferably not less than 50 mol % of urea groups, based on the sum total of urethane and urea groups.

Examples of useful diisocyanates of the general formula (5) are aliphatic compounds such as isophorone diisocyanate, hexamethylene 1,6-diisocyanate, tetramethylene 1,4-diisocyanate and methylenedicyclohexyl 4,4'-diisocyanate or aromatic compounds such as 4,4'-methylenediphenylene diisocyanate, 2,4-toluene diisocyanate, 2,5-toluene diisocyanate, 2,6-toluene diisocyanate, m-phenylene diisocyanate, p-phenylene diisocyanate, m-xylene diisocyanate, tetramethyl-m-xylene diisocyanate or mixtures thereof. Examples of commercially available isocyanates are the diisocyanates of the DESMODUR® series (H,I,M,T,W) from Bayer AG, Germany. Preference is given to aliphatic diisocyanates where Y is alkylene, since these lead to materials which exhibit improved UV stabilities which are advantageous in any exterior application of the polymers.

Aminoalkyl-terminated silicone oils possess not only siloxane units but also nonhydrolyzable amino functions. These are preferably substantially free of contamination from mono-, tri- or higher functional silicone oils. They are prepared by known methods such as for example equilibration reactions, or by hydrosilylation of α,ω H-siloxanes with allylamine etc. However, thus prepared components, by the very nature of their preparation process, comprise impurities and characteristics such as molecular weight distributions, such that the amine oils and hence also the copolymers prepared therefrom are subject to color fluctuations, undesirable odors, possibly contain catalyst residues or else may inhibit other catalysts. Particular preference is therefore given to aminosilicones prepared by the route described in DE 10051886 C, since these are free of the disadvantages described above.

Hydroxyalkyl-terminated silicone oils possess not only siloxane units but also nonhydrolyzable hydroxyl functions. These are preferably substantially free of contamination from mono-, tri- or higher functional silicone oils. The link between the silicon atom and the OH function may likewise be a polyoxyalkylene group, such as polyethylene oxide or polypropylene oxide, or a polyester group, such as polycaprolactone. Appropriate products are marketed by Th. Goldschmidt under the name Tegomer® H—Si 2111, 2311 and 2711 or for example by OSi Specialties under the name Silwet®. The hydroxyalkylsilicones influence inter alia the melt viscosities and the softening ranges of the resulting block copolymers.

Chain extenders are difunctional and usually low molecular weight compounds, preferably diamines or diols, that are mostly used for improving the mechanical properties of the polymer. Non-limiting examples thereof are 1,4-butanediol, diethylene glycol, aminoethanol, ethylenediamine, Dytek A, or mixtures thereof. In the case of the diamines, for example, the amino group can also be part of a cyclic compound.

The α,ω-OH-terminated alkylenes of the general formula (7) are preferably polyalkylenes or polyoxyalkylenes. Useful for this purpose are polyetherpolyols, polytetramethylene ether diols, polyesterpolyols, polycaprolactone diols but also α,ω-OH-terminated polyalkylenes based on polyvinyl acetate, polyvinyl acetate ethylene copolymers, polyvinyl chloride copolymers, polyisobutylene diols, hydrogenated polybutadiene diols, polybutadiene diols, polycarbonate diols and their derivatives, for example, fluorinated derivatives. Preference is given to using polyoxyalkylene diols, preferably polyoxypropylene glycols. Such compounds are commercially available for use as inter alia for flexible polyurethane foams and for coating applications, with molecular weights Mn of up to 10,000 and higher. Examples thereof are the BAYCOLL® polyetherpolyols and polyesterpolyols from Bayer AG, Germany, or the Acclaim® polyetherpolyols from Bayer Corp., USA.

Useful chain-terminating reagents to produce Q groups include, for example, monoisocyanates, alcohols such as ethanol and propanol, mono-hydroxy-functionalized polyethers, polyesters or polycarbonates, or amines such as dibutylamine, butylamine or mono-amino-functionalized polyethers, polyesters or polycarbonates. These lead to chemically inert chain ends and so inhibit excessive molecular weight during polymerization and hence an excessive rise in the viscosity of the reaction solution. At the same time, the use of polyether segments, for example polyoxyethylene segments at the chain end, makes it possible to influence the dispersibility of the polymers in water. It is similarly possible to use amino-functional alkoxysilanes such as for example A1100 from Crompton or N-(2-aminoethyl)-3-aminopropyltrimethoxysilane or 3-aminopropyltriethoxysilane. The use of isocyanate-functionalized alkoxysilanes such as isocyanatopropyltriethoxysilane is likewise possible. The use of these silanes leads to the covalent attachment of alkoxysilyl groups, which can either confer adhesion-promoting properties on the polymer, or else can lead to the subsequent crosslinking of the polymer, for example in dispersion, and hence alter the mechanical properties of the polymer. The crosslinking can be catalyzed in accordance with the prior art.

Groups having strongly hydrophilic or ionic groups lead to an enhanced water solubility or to an improvement of the dispersibility of the polymer in water. The stability of the dispersion in water is improved at the same time. In the coated fabric, such groups increase the water vapor transmission through coated fabrics. Ionic compounds are usually used for this purpose, for example carboxylates, sulfates, sulfonates, phosphates or ammonium compounds which are covalently attached to the polymer. The corresponding counterions are for example metal ions or halide ions. An example of a strong hydrophilic group is for example dimethylolpropionic acid which is bound into a prepolymer in the form of the carboxylic acid and is not converted with base (e.g. triethylamine) into a carboxylate salt until a second stage, for example during the chain extension of prepolymers with chain extenders.

The solvents used in the preparation of the block copolymers of the general formula (1) should be inert toward isocyanate groups. It is customary to use for example toluene, acetone, methyl ethyl ketone, DMF, THF, NMP or dimethylacetamide or mixtures thereof. However, it is also possible to use for example isopropanol when diamines are reacted with isocyanates, since diamines display distinctly increased reactivity as compared to the hydroxylic solvent. It is customary to employ solvents in order to avoid greatly increased viscosities during the reaction. At the same time, the use of suitable solvents (e.g. acetone, methyl ethyl ketone, THF) makes it possible to disperse the polymer solution in water and subsequently to remove the organic solvent again from the polymer dispersion. Furthermore, some solvents assist filming in the case of dispersions, an example being NMP.

The reaction, as is customary with the preparation of polyurethanes, is preferably effected by adding a catalyst. Useful catalysts for the preparation are dialkyltin compounds, for example dibutyltin dilaurate or dibutyltin acetate, or tertiary amines such as for example N,N-dimethylcyclohexaneamine, 2-dimethylaminoethanol, or 4-dimethylaminopyridine. The use of specific catalysts can also be dispensed with in the event of the exclusive use of amine components and diisocyanates.

The above-described copolymers of the general formula (1) can be prepared in solution or else neat, continuously or batchwise. What is essential is that the constituents of the polymer mixture chosen be thoroughly and homogeneously mixed under the reaction conditions and any excessive phase incompatibility between the reaction components be prevented by means of solubilizers. The preparation method depends on the solvent used. When the fraction of hard segments such as urethane or urea segments is large, it may be necessary to use a solvent having a high solubility parameter, for example dimethylacetamide. For most syntheses, THF, acetone, MEK, isopropanol and also toluene have been determined to be sufficiently suitable. All constituents are preferably dissolved in an inert solvent. Preference is likewise given to a synthesis without solvent.

A particularly preferred form of block copolymers of the invention is water-dispersible systems of general formula I, i.e. systems which contain ionic groups and thus are self-dispersing. These have the advantage of processing in the liquid state without volatile solvents being released during processing.

A further preferred embodiment is the synthesis of straight siloxane-urea copolymers (A is an amino group —NR'— and Z is likewise an amino group —NR'—), since in this case the reaction between the amine groups and the isocyanate groups takes place without a catalyst, i.e. it is possible to dispense with, for example, tin catalysts which are usually needed to form urethane groups. These materials, furthermore, in contradistinction to the siloxane-urea-urethane copolymers, are notable for superior mechanical properties, partly increased transparency, and especially, higher softening ranges which can be of advantage in the ironing of these materials.

A decisive factor for the reaction without solvent is the homogenization of the mixture during the course of the reaction. Furthermore, the polymerization may also be controlled through the choice of the reaction sequence in the case of a stepped synthesis.

The textile structures of the present invention, as well as the block copolymer (A) comprise fibers, which can be used for example as yarn and as textile fabrics such as wovens, formed-loop knits, nonwoven scrims, drawn-loop knits, nonwovens, felts, etc.

The textile fabrics can be fabricated from mineral fibers such as glass fibers or silicate fibers, natural fibers such as wool, silk or cotton, manufactured fibers such as polyester fibers, polyamide fibers or interpolymer fibers, or metallic fibers. Filamentary fibers or staple fibers of the substrates mentioned can be used. Fabrics from fiber blends such as cotton-polyester and also natural sheetlike structures such as leather can also be used.

The block copolymer (A) can be used as a coating material or finishing material for fibers and textile fabrics.

The coating or finish can be applied by any suitable method, for example, by the knife or bar coating method, dip and squeeze method, extrusion method, spraying, flocking or atomizing method, pad-mangling, exhaust or dip and spin method, tamponing method, or pressing method. In addition, all types of roll coatings, such as gravure coating, slop padding or application via multiroll systems, and also printing, for example rotary screen printing are possible. Foam application and subsequent calendering is possible with this material. Application by calender or melt calender is possible.

Block copolymer (A) is suitable for printing, cladding, laminating, and bonding. Block copolymer (A) can also be applied by transfer coating. The use as a laminating material, adhesive and hotmelt is possible. Block copolymer (A) is further useful for sealing seams.

The textile structures can be used wherever particularly high end requirements are demanded. Examples are hang gliders, parachutes, hot-air balloons, leisure clothing, leisure articles such as tents or rucksacks, sails or airbags. In the industrial sector, the textile structures are very useful for conveyor belts, compensators, awnings, textile building materials or in the insulation sector.

All the above symbols in the above formulae each have their meanings independent of each other.

In the examples below, unless otherwise stated, all amounts and percentages are by weight and all pressures are 0.10 MPa (abs.). All viscosities were determined at 20° C. The molecular weights were determined by GPC in toluene (0.5 ml/min) at 23° C. (column: PLgel Mixed C+PLgel A, detector: RI ERC7515).

PDMS is Polydimethylsiloxane
TPE is Block Copolymer (A)

PREPARATION EXAMPLE 1

A 250 ml flask equipped with dropping funnel and reflux condenser was charged with 40 g of bisaminopropyl-PDMS (molecular weight 3,200) in a solvent mixture of 80 ml of dry THF and 20 ml of dimethylacetamide. A solution of 2.33 g of 4,4'-methylenediphenylenediisocyanate in 20 ml of dry THF was then added dropwise at room temperature, followed by refluxing for 1 hour. After the solution had cooled down, the polymer was precipitated by dropwise addition into hexane. The clear polymer obtained had a molecular weight Mw of 161,000 g/mol and a TMA softening point of 154° C.

PREPARATION EXAMPLES 2–10

A bisaminopropyl-PDMS having a molecular weight of 3,200 g/mol or 11,000 g/mol was reacted with other diisocyanates in a manner similar to that of Preparation Example 1. The results are listed in table 1:

| Prep. ex. | Amine Oil | Diiso-cyanate | Yield | Molecular weight (Mw) [g/mol] | Softening |
|---|---|---|---|---|---|
| 2 | 3,200 g/mol | IPID | 95% | 88,000 | 65° C. |
| 3 | 3,200 g/mol | HMDI | 92% | 95,000 | 63° C. |
| 4 | 3,200 g/mol | TDI | 88% | 114,000 | 131° C. |
| 5 | 3,200 g/mol | TMXDI | 96% | 110,000 | 171° C. |
| 6 | 3,200 g/mol | H12MDI | 94% | 97,000 | 126° C. |
| 7 | 11,000 g/mol | MDI | 89% | 154,000 | not determined |
| 8 | 11,000 g/mol | IPID | 87% | 167,000 | not determined |
| 9 | 11,000 g/mol | TDI | 93% | 198,000 | not determined |
| 10 | 11,000 g/mol | H12MDI | 91% | 212,000 | 120° C. |

PREPARATION EXAMPLE 11

A twin-screw kneader having 4 heating zones from Collin, Ebersberg, was charged under nitrogen with the diisocyanate in the first heating zone and with the aminopropyl-terminated silicone oil in the second heating zone. The temperature profile of the heating zones was programmed as follows: zone 1, 30° C.; zone 2, 100° C.; zone 3, 150° C.; zone 4, 140° C. The rotational speed was 50 rpm. The diisocyanate (methylenebis(4-isocyanatocyclohexane)) was metered into zone 1 at 304 mg/min and the amine oil (3,200 g/mol) was metered into zone 2 at 3.5 g/min. From the extruder die issued a clear polydimethylsiloxane-polyurea block copolymer having a molecular weight of 110,000 g/mol and a softening temperature of 126° C.

PREPARATION EXAMPLE 12

Preparation example 11 was repeated except that a twin-screw kneader from Collin, Ebersberg (Teach-Line) having 4 heating zones set to the following temperature profile (zone 1, 30° C.; zone 2, 90° C.; zone 3, 120° C.; zone 4, 130° C.; rotational speed, 50 rpm) was charged under nitrogen with the diisocyanate (isophorone diisocyanate) in zone 1 at 252 mg/min and with the amine oil (3,200 g/mol) in zone 2 at 3.5 g/min. From the extruder die issued a clear polydimethylsiloxane-polyurea block copolymer having a softening temperature of 58° C. It had a molecular weight of 52,000 g/mol.

PREPARATION EXAMPLE 13

Preparation example 11 was repeated except that a twin-screw kneader from Collin, Ebersberg (Teach-Line) having 4 heating zones set to the following temperature profile (zone 1, 30° C.; zone 2, 100° C.; zone 3, 170° C.; zone 4, 180° C.; rotational speed, 50 rpm) was charged under nitrogen with the diisocyanate (toluene 2,4-diisocyanate) in zone 1 at 111 mg/min and with the amine oil (11,000 g/mol) in zone 2 at 5.2 g/min. From the extruder die issued a clear polydimethylsiloxane-polyurea block copolymer having a softening temperature of 87° C. It had a molecular weight of 195,000 g/mol.

PREPARATION EXAMPLE 14

Preparation example 11 was repeated except that a twin-screw kneader from Collin, Ebersberg (Teach-Line) having 4 heating zones set to the following temperature profile (zone 1, 30° C.; zone 2, 80° C.; zone 3, 140° C.; zone 4, 120° C.; rotational speed, 50 rpm) was charged under nitrogen with an isocyanate-terminated copolymer (prepared from 0.2 mol of Tegomer H—Si 2711 (hydroxyhexyl-terminated PDMS) and 1.3 mol of isophorone diisocyanate in the presence of dibutyltin dilaurate by heating at 50° C. for 5 hours) in zone 1 at 6.4 g/min and the amine oil (3,450 g/mol) in zone 2 at 19.0 g/min. From the extruder die issued a polydimethylsiloxane-polyurea-polyurethane block copolymer having a softening temperature of 35° C. It had a molecular weight of 86,000 g/mol.

PREPARATION EXAMPLE 15

A 250 ml flask equipped with dropping funnel and reflux condenser was charged with 32 g of bisaminopropyl-PDMS (molecular weight 3,200) and 5 g of bishydroxypropyl-PDMS (Tegomer 2711, Th. Goldschmidt AG, molecular weight 5,200) in a solvent mixture of 80 ml of dry THF and 20 ml of dimethylacetamide. After 3 drops of dibutyltin dilaurate had been added, a solution of 2.5 g of isophorone diisocyanate in 20 ml of dry THF was added dropwise at room temperature, followed by refluxing for 2 hours. After the solution had cooled down, the polymer was precipitated by dropwise addition to hexane. The copolymer obtained had a molecular weight Mw of 78,000 g/mol and a softening point at 42° C.

PREPARATION EXAMPLE 16

A 250 ml flask equipped with dropping funnel and reflux condenser was charged with 32 g of bisaminopropyl-PDMS (molecular weight 3,200) and 0.9 g of butanediol in a solvent mixture of 80 ml of dry THF and 20 ml of dimethylacetamide. After 3 drops of dibutyltin dilaurate had been added, a solution of 4.5 g of isophorone diisocyanate in 20 ml of dry THF was added dropwise at room temperature, followed by refluxing for 2 hours. After the solution had cooled down, the polymer was precipitated by dropwise addition to hexane. The copolymer obtained had a molecular weight Mw of 63,000 g/mol.

PREPARATION EXAMPLE 17

A 250 ml flask equipped with dropping funnel and reflux condenser was charged with 32 g of bisaminopropyl-PDMS (molecular weight 3,200) and 1.2 g of hexamethylenediamine in a solvent mixture of 80 ml of dry THF and 20 ml of dimethylacetamide. A solution of 4.5 g of isophorone diisocyanate in 20 ml of dry THF was added, followed by refluxing for 2 hours. After the solution had cooled down, the polymer was precipitated by dropwise addition to hexane. The copolymer obtained had a molecular weight Mw of 73,000 g/mol.

PREPARATION EXAMPLE 18

In a 2,000 ml flask equipped with dropping funnel and reflux condenser, a solution of 136 g of bisaminopropyl-PDMS (molecular weight 3,450) in 250 ml of methyl ethyl ketone (MEK) was added dropwise to a solution of 44.4 g of isophorone diisocyanate in 350 ml of MEK, followed by stirring at room temperature for 30 min. This was followed by the addition of 3 drops of dibutyltin dilaurate and of a solution of 21.5 g of dimethylolpropionic acid and 18.2 g of triethylamine in 70 ml of MEK and refluxing for 5 hours. The viscous solution was subsequently dispersed in 1 500 ml of water by vigorous stirring and the MEK and some water removed under reduced pressure in a rotary evaporator. This left a PDMS-polyurea-polyurethane dispersion in water that had a solids content of 42% and was still stable 3 months later.

PREPARATION EXAMPLE 19

In a 2,000 ml flask equipped with dropping funnel and reflux condenser, a solution of 136 g of bisaminopropyl-PDMS (molecular weight 3,450) in 100 ml of methyl ethyl ketone (MEK) was added dropwise to a solution of 52.4 g of methylenebis(4-isocyanatocyclohexane) in 200 ml of MEK, followed by stirring at room temperature for 30 min. This was followed by the addition of 3 drops of dibutyltin dilaurate and of a solution of 21.5 g of dimethylolpropionic acid and 18.2 g of triethylamine in 70 ml of MEK and refluxing for 5 hours. The viscous solution was subsequently dispersed in 1,500 ml of water by vigorous stirring and the MEK and some water removed under reduced pressure in a rotary evaporator. This left a PDMS-polyurea-polyurethane dispersion in water that had a solids content of 33% and was still stable 3 months later.

EXAMPLE 20

In a 2,000 ml flask equipped with dropping funnel and reflux condenser, a solution of 180 g of bisamino-propyl- PDMS (molecular weight 3,450) in 100 ml of methyl ethyl ketone (MEK) was added dropwise to a solution of 66.6 g of isophorone diisocyanate in 200 ml of MEK, followed by stirring at room temperature for 30 min. This was followed by the addition of 3 drops of dibutyltin dilaurate and of a solution of 26.8 g of dimethylolpropionic acid and 20.2 g of triethylamine in 70 ml of MEK and refluxing for 5 hours. The viscous solution was subsequently dispersed by vigorous stirring in 1,500 ml of water which additionally contained 3.3 g of ethylenediamine. MEK and some water were removed under reduced pressure in a rotary evaporator. This left a PDMS-polyurea-polyurethane dispersion in water that had a solids content of 25% and was still stable 3 months later.

PREPARATION EXAMPLE 21

In a 2,000 ml flask equipped with dropping funnel and reflux condenser, a solution of 180 g of bisaminopropyl-PDMS (molecular weight 3,450) in 100 ml of methyl ethyl ketone (MEK) was added dropwise to a solution of 66.6 g of isophorone diisocyanate in 200 ml of MEK, followed by stirring at room temperature for 30 min. This was followed by the addition of 3 drops of dibutyltin dilaurate and of a solution of 26.8 g of dimethylolpropionic acid and 20.2 g of triethylamine in 70 ml of MEK and refluxing for 5 hours. Thereafter, 23.6 g of aminopropyltriethoxysilane were added and subsequently the viscous solution was dispersed in 1,500 ml of water by vigorous stirring. MEK and some water were removed under reduced pressure in a rotary evaporator. This left a PDMS-polyurea-polyurethane dispersion in water that had a solids content of 21% and was still stable 3 months later.

USE EXAMPLE 1

A woven nylon-6,6 fabric having an areal weight of 65 g/m$^2$ was knife coated with a solution of the TPE of preparation example 11 in a mixture of 1 part of isopropanol and 1 part of toluene. The solvent was evaporated off in an oven at 120° C. A coating weight of 10 g/m$^2$ was obtained.

The coating obtained was uniform and comprised an uninterrupted transparent film and a shiny surface. It was waterproof at >100 mbar. Water beaded off in droplet form. The coating was soft and gave a pleasantly soft hand.

The coated textile was weldable at 180° C. using a hot press. The coating was unimpaired after 5 washes at 40° C. in a conventional washing machine. The coating was highly soil-repellent. Coffee drops did not give rise to a brown residue and were readily removable with a moist cloth. Similarly, ballpoint pen ink was simply removable with a moist cloth.

USE EXAMPLE 2

The TPE of preparation example 18 was knife coated onto a woven polyester fabric having an areal weight of 80 g/m$^2$ from an aqueous solution. The water was evaporated off at 150° C. A coating weight of 10 g/m$^2$ was obtained.

The coated fabric was notable for the following property profile:

A drop of water became spread out on the surface (the surface was hydrophilic), but did not pass through. The coated fabric was waterproof up to 30 mbar, and exhibited a Lyssy water vapor transmission rate of 1,354 g/m$^2$·d. By comparison, the transmission rate of the uncoated fabric was 1,800 g/m$^2$·d.

A comparison with a conventional coating of silicone rubber revealed a water vapor transmission rate of 700 g/m$^2$·d coupled with waterproofness to 35 mbar, while a comparison with a conventional coating of polyurethane revealed a water vapor transmission rate of 800 g/m$^2$·d and waterproofness only to <10 mbar.

USE EXAMPLE 3

A 100% cotton, 250 g/m$^2$ interlock fabric (16 courses/14 wales) was finished with a 0.5% isopropanolic solution of the TPE of preparation examples 11 and 12 using a pad-mangle operating at a squeeze-off pressure of 3 bar. The wet pickup was 70%. The fabric samples were subsequently first dried at 150° C. in a laboratory tenter for 3 min.

After 48 hours of conditioning, the samples were presented to a panel of 5 people for hand evaluation against a reference sample finished with a silicone amine oil emulsion (Wacker® Finish CT 34 E) to an identical silicone add-on level. The hand differences were judged by all members of the panel as distinct. The judges were unanimous in ranking the samples in the following descending order of hand pleasantness: TPE of preparation example 11, TPE of preparation example 12, Wacker® Finish CT 34 E reference sample, blank value (no finish).

USE EXAMPLE 4

A 100% cotton 110 g/m$^2$ poplin fabric woven with 60 ends/cm and 36 pics/cm was finished with a 0.5% isopropanolic solution of the TPEs of preparation examples 11 and 12 using a pad-mangle operating at a squeeze-off pressure of 3 bar. The wet pickup was 70%. The fabric samples were initially air dried.

They were then given an anticreasing finish with a commercially available crosslinker resin based on a DMDHEU resin (Arcofix), conditioned for 48 h and evaluated for hand and crease recovery angle. The measured results are listed in Table II:

| TPE finish Padding with 0.5% solution in ipropanol. Air drying | 40 g/l DMDHEU 10 g/l MgCl2 1 g/l NaBF4 | 0.5 g/l acetic acid | Hand high value = good | Crease angle poplin warp | | Crease angle poplin weft | |
|---|---|---|---|---|---|---|---|
| | | | | 1 min | 30 min | 1 min | 30 min |
| 1 | x | x | 0 | 44 | 56 | 46 | 56 |
| 2 | | x | 1 | 33 | 46 | 35 | 44 |
| 6 Prep. ex. 11 | | x | 4 | 52 | 63 | 47 | 58 |
| 7 Prep. ex. 11 | x | x | 4 | 74 | 90 | 85 | 99 |
| 6 Prep. ex. 12 | | x | 3 | 45 | 58 | 51 | 61 |
| 7 Prep. ex. 12 | x | x | 2 | 75 | 85 | 79 | 94 |

The fabric samples finished with TPEs exhibit an excellent synergism with the effect of the crosslinker resin. At the same time, the hand-compromising action of the resin finish is eliminated.

USE EXAMPLE 5

Fiberfill composed of 6.7 dtex Trevira PES staple fibers was dip-finished with the TPEs of preparation examples 11 and 12. The finish was applied from a solution in isopropanol to a product add on of 0.3% by weight on the fiber. drying at 150° C. for 5 min and 180° C. for 5 min, the hand was evaluated.

In addition, 15 g of each fiber were replaced in a beaker, covered with a plastic disk and loaded with a weight of 1 kg for 1 hour. The height of the plastic disk was read off prior to removal of the weight (compression value) and 30 min removal of the weight (recovery). The results are listed in Table III:

| Product | Compression value | Recovery | Hand |
|---|---|---|---|
| Blank | 7 cm | 9 cm | poor |
| Prep. Ex. 11 TPE | 5.2 cm | 10 cm | very good |
| Prep. Ex. 12 TPE | 5.5 cm | 10 cm | good |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Textile structures comprising fibers and an organopolysiloxane-polyurea-(polyurethane) block copolymer (A) having the formula:

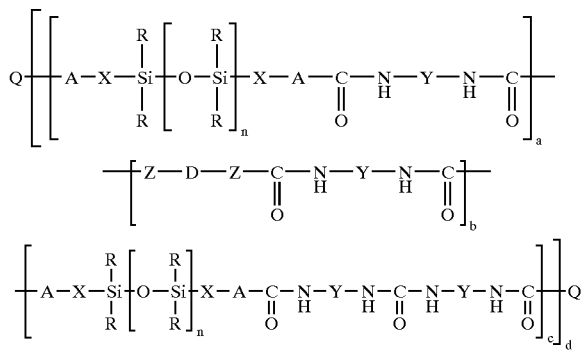

as a coating material or finishing material for fibers where

R is monovalent $C_{1-20}$ hydrocarbyl optionally substituted by fluorine or chlorine,
X is $C_{1-20}$ alkylene in which mutually nonadjacent methylene units are optionally replaced by —O— moieties,
A is an oxygen atom or an amino group —NR'—,
Z is an oxygen atom or an amino group —NR'—,
R' is hydrogen or $C_{1-10}$ alkyl,
Y is divalent $C_{1-20}$ hydrocarbyl optionally substituted by fluorine or chlorine,
D is $C_{1-1500}$ alkylene in which mutually nonadjacent methylene units may be replaced by —O—, —COO—, —OCO— or —OCOO— moieties, said methylene units optionally substituted by fluorine, chlorine, $C_1$–$C_6$-alkyl or optionally substituted $C_1$–$C_6$-alkyl ester groups, the optional substituents of said alkyl ester groups selected from the group consisting of amino groups optionally reacted with an acid, and carboxylic acid and sulfonic acid groups optionally reacted with a base,
Q is a reactive or nonreactive end group which is covalently attached to the polymer,
n is from 1 to 4,000,
a is at least 1,
b is from 0 to 40,
c is from 0 to 30, and
d is greater than 0.

2. The textile structure of claim 1, wherein R is monovalent hydrocarbyl of 1 to 6 carbon atoms.

3. The textile structure of claim 1, wherein X is alkylene of 1 to 10 carbon atoms.

4. The textile structure of claim 2, wherein X is alkylene of 1 to 10 carbon atoms.

5. The textile structure of claim 1, wherein a is not more then 50.

6. The textile structure of claim 2, wherein a is not more then 50.

7. The textile structure of claim 3, wherein a is not more then 50.

8. The textile structure of claim 1, wherein n is from 3 to 400.

9. The textile structure of claim 1 wherein said organopolysiloxane-polyurea-(polyurethane) block copolymer is an organopolysiloxane-polyurea block copolymer.

10. A process for coating or finishing fiber, yarn and/or textile fabric, comprising applying thereto block copolymer (A) of claim 1.

11. A process for coating or finishing fiber, yarn and/or textile fabric, comprising applying thereto block copolymer (A) of claim 2.

12. A process for coating or finishing fiber, yarn and/or textile fabric, comprising applying thereto block copolymer (A) of claim 3.

13. A process for coating or finishing fiber, yarn and/or textile fabric, comprising applying thereto block copolymer (A) of claim 5.

14. A process for coating or finishing fiber, yarn and/or textile fabric, comprising applying thereto block copolymer (A) of claim 8.

15. The process of claim 10, wherein said block copolymer (A) is applied to a fabric to form a continuous coating on at least one surface thereof.

16. The textile structure of claim 1, wherein Q is derived from reaction with a chain terminating reagent selected from the group consisting of monoisocyanates, alcohols, mono-hydroxyl-terminated polyethers, mono-hydroxyl-terminated polyesters, mono-hydroxyl-terminated polycarbonates, amines, mono-amine-terminated polyethers, mono-amine-terminated polyesters, and mono-hydroxyl-terminated polycarbonates.

* * * * *